Dec. 5, 1967  C. D. RHYMES, JR  3,356,229
PIPE RACK
Filed Aug. 5, 1966

INVENTOR.
CASSIUS D. RHYMES, JR.
BY
Naylor & Neal
ATTORNEYS

United States Patent Office 3,356,229
Patented Dec. 5, 1967

3,356,229
PIPE RACK
Cassius D. Rhymes, Jr., 173 E. Blithedale Ave.,
Mill Valley, Calif. 94941
Filed Aug. 3, 1966, Ser. No. 569,971
6 Claims. (Cl. 211—60)

The present invention relates to a rack for the storing of smoking pipes and, more particularly, is directed to such a rack having an increased storage capacity as compared to convenional racks of a similar size.

Pipe smokers generally, over a period of years, tend to accumulate a large number of pipes. While a smoker may acquire preferences for certain pipes, he usually desires to retain other pipes for occasional use. Thus, it is necessary for the smoker to provide storage for a considerable number of pipes. This presents a particular problem, since conventional pipe racks are capable of only storing in the neighborhood of a half a dozen pipes.

In addition to being of limited capacity, conventional pipe racks are also typically characterized in that they employ pipe stem support structure which requires that the stem of a pipe stored therein be threaded through an aperture. As a result of this characteristic, it is very awkward to effect both the insertion and removal of pipes from such racks.

It is, accordingly, a principal object of the present invention to provide a pipe rack which avoids prior art shortcomings of the aforementioned type.

A more specific object of the invention is to provide a pipe rack capable of conveniently storing a maximum number of pipes in a minimal volume.

Yet another object of the invention is to provide a pipe rack which is economical to manufacture and attractive in appearance.

Broadly, the present invention comprises a rack construction wherein pipes may be conveniently stored in stacked relationship relative to each other. The construction includes means to effect the stable bowl and stem support of all pipes contained therein.

The foregoing and other objects and the detailed construction of the invention will become more apparent when viewed in light of the following description and accompanying drawings, wherein.

Figure 1:
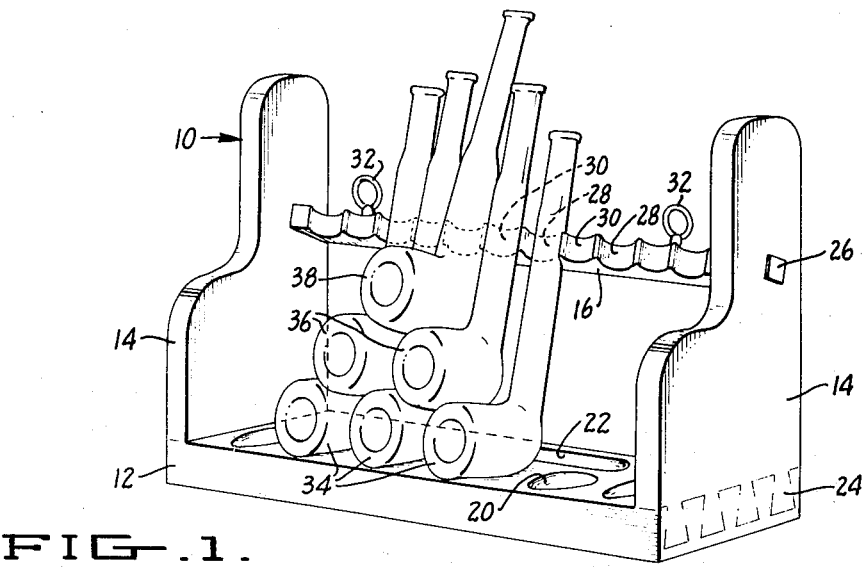
FIG. 1 is a perspective view of a pipe rack embodying the invention.

Referring now to the drawings, the rack therein is designated in its entirety by the numeral 10. The basic elements of the rack include: a pipe bowl supporting base 12; side boards 14 fixed to and extending upwardly from opposed end portions of the base; and, a pipe stem supporting rail 16 fixed to and extending between the side boards 14 in spaced relationship with respect to the base 12.

The base 12 is of generally elongated configuration and has formed in the forward portion of the upper surface thereof a plurality of pipe bowl receiving pockets 20 of frusto-egg-shaped configuration. The pockets 20 are proportioned to securely receive the bowls of the lowermost pipes supported on the rack. The base 12 also has formed in the upper surface thereof, rearwardly of the pockets 20, an elongated recess 22. This recess is provided for the storage of pipe cleaners and includes rounded end portions to facilitate the individual removal of pipe cleaners therefrom.

The sideboards 14 are of generally L-shaped configuration and are secured to the base 12 at their lower portions by dovetail connections 24. These connections provide for the secure mounting of the side boards to the base in spaced parallel relationship relative to each other. If the dovetail connections 24 are used without glue, they also facilitate the knock-down of the side boards from the base 12 for storage or transportation purposes.

The rail 16 is mounted between the side boards 14 in spaced relationship relative to the base 12. Mounting of the rail is provided by rectangular dowel connections 26 between the respective end portions thereof and mating openings formed in the side boards 14. These dowel connections provide for the secure mounting of the rail at a predetermined angle relative to the base 12, as can be seen from FIG. 3. If the dowel connections 26 are not glued, they also facilitate knock-down of the rack similarly to the dovetail connections 24. The angle between the base 12 and rail 16 is selected so that the stems of pipes supported on the rack and resting against the rail will assume substantially parallel seated relationship with respect to the leading surfaces of the rail. The latter characteristic, as will become more apparent from the subsequent discussion, is illustrated in FIG. 3.

Figure 4:
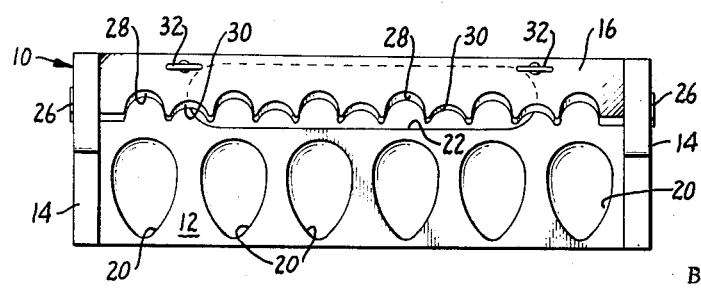

Referring now to FIG. 4, therein it can be seen that the leading surfaces of the rail 16 are defined by a plurality of primary and secondary grooves 28 and 30, respectively. The grooves 28 are each disposed, respectively, in alignment with one of the pockets 20. Through this arrangement, when the bowl of a pipe is received in one of the pockets 20, its stem is seated within the groove 28 above the pocket and, thus, the pipe is maintained in upright condition. The grooves 30 are disposed, respectively, between each adjacent set of the grooves 28. The latter grooves are designed, as can be seen from FIGS. 1 and 2, to support the stems of pipes having bowls stacked upon the bowls of pipes resting in the pockets 20. Preferably, the grooves 28 and 30 are so proportioned relative to each other that pipe stems supported thereby will assume substantially parallel relationship. It is also preferable that the rail 16 and pipe stem supporting grooves 28 and 30 thereof be so positioned that pipe stems of normal length supported thereby will not project rearwardly of the rack. The latter characteristic is desirable because it facilitates positioning of the rack with the rear surfaces of the side boards 14 directly against a wall or other vertically disposed surface. With this characteristic, if desired, eyes 32 may be mounted on the rail 16 to facilitate hanging of the rack.

Figure 2:
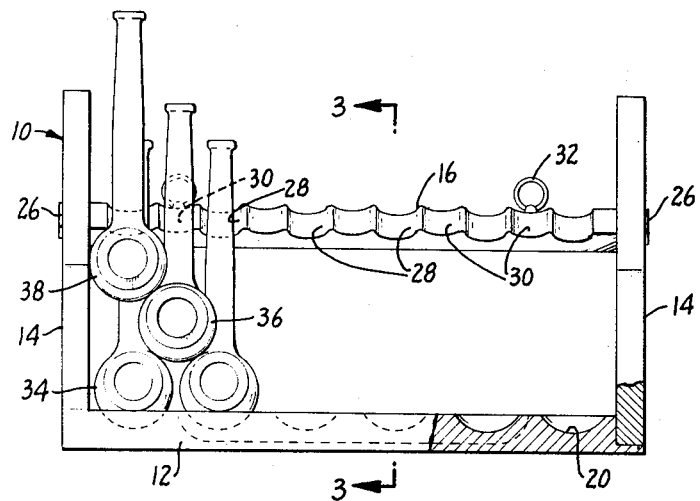
FIG. 2 is a front elevational view of the rack illustrated in FIG. 1.
Figure 3:
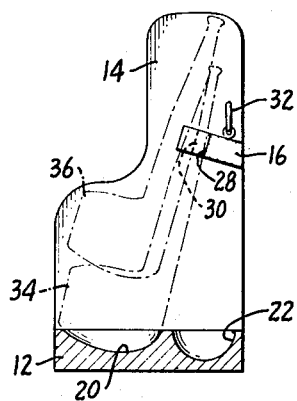
FIG. 3 is a sectional view taken on the plane designated by line 3—3 in FIG. 2; and, FIG. 4 is a plan view of the pipe rack illustrated in FIG. 1.

The manner in which the rack 10 may be employed for the storage of pipes is represented in FIGS. 1, 2, and 3. From these figures, it can be seen that the rack may be employed to support one or more rows of pipes, with the bowls of successive rows of pipes resting upon each other in stacked relationship. The exemplary rows of pipes illustrated in these figures are comprised of pipes 34 having the bowls thereof received in the pockets 20 to define a first row; pipes 36 having the bowls thereof resting upon the bowls of the pipes 34 to define a second row; and, pipes 38 having the bowls thereof resting upon the bowls of the pipes 36 to define a third row. Although only one pipe 38 is illustrated, it is to be understood that the rack may be filled to a degree wherein the third row is comprised of a plurality of pipes.

When stacked in the manner illustrated in FIGS. 1, 2, and 3, the stems of the pipes 34 and 36 are supported, respectively, in the grooves 28 and 30. In this stacked relationship, the stems of the pipes 38 are supported on the rack, indirectly, by contact with the stems of the pipes 34 therebeneath. Indirect support of the bowls of pipes 36 and 38 is similarly provided by contact with the bowls of the pipes directly therebeneath. The latter support results because the immediately adjacent pipes in the respective rows are so orientated as to be adapted to support the bowls of pipes thereon to define successive rows which are staggered relative to each other. It is here noted that the side boards 14 are so positioned and proportioned as to effect lateral support of the bowls of the end-most pipes 38 defining a third row. The latter characteristic is illustrated in FIG. 2.

From the foregoing description, it is believed apparent that the present invention enables the attainment of the objects initially set forth herein. It is to be understood, however, that the invention is not intended to be limited to the details of the exemplary embodiment herein illustrated and described. For example, it is anticipated that the rack may be filled to a greater or lesser degree than illustrated and that even more than three rows of pipes may be stacked on the rack.

What is claimed is:

1. A smoking pipe rack, comprising:
   (a) a base having a pipe bowl receiving portion adapted to suport the bowls of a plurality of pipes thereon in side-by-side relationship to define a first row of pipes wherein the bowls of immediately adjacent pipes are so orientated as to be adapted to support the bowls of pipes thereon to define a second row of pipes stacked upon and staggered with respect to said first row; and
   (b) pipe stem support means fixed relative to and extending over said base in spaced relationship relative to the bowl receiving portion thereof, said support having:
      (1) first pipe stem contacting surfaces adapted, respectively, to engage and effect support of the stems of pipes having bowls supported on said bowl receiving portion to define a first row of pipes; and,
      (2) second pipe stem contacting surfaces adapted, respectively, to engage and effect support of the stems of pipes defining a second row of pipes supported on the bowls of pipes defining a first row of pipes.

2. A rack according to claim 1, wherein:
   (a) said base comprises an elongated substantially horizontally disposed member;
   (b) said support means comprises a rail disposed rearwardly relative to the pipe bowl receiving portion of said base;
   (c) said first pipe stem contacting surfaces comprise a plurality of substantially vertically disposed primary grooves extending across the forward edge of said rail, adjacent of said grooves being spaced relative to each other; and
   (d) said second pipe stem contacting surfaces comprise a plurality of substantially vertically disposed secondary grooves extending across the forward edge of said rail, respectively, between adjacent of said primary grooves.

3. A rack according to claim 2, wherein:
   (a) said bowl receiving portion comprises a plurality of upwardly facing pockets formed on said member;
   (b) said pockets are each proportioned so as to be adapted to receive therein, at least partially, the bowl of a pipe; and
   (c) said pockets are each aligned, respectively, with one of said primary recesses.

4. A rack according to claim 3, wherein said base has formed therein rearwardly of said pockets an elongated groove adapted to contain pipe cleaners.

5. A rack according to claim 2, wherein:
   (a) said pipe stem support means is fixed relative to said base by a pair of side boards, respectively, fixed to and extending upwardly from opposed end portions of said base to fixed engagement with opposed end portions of said rail;
   (b) the immediately adjacent pipes of a second row of pipes supported on said rack are so orientated as to be adapted to support the bowls of pipes thereon to define a third row of pipes stacked upon and staggered with respect to said second row; and
   (c) said side boards are adapted to effect lateral support of the end-most pipes in a third row of pipes supported on said rack.

6. A rack according to claim 2, wherein said primary and secondary grooves are so proportioned relative to each other that similarly proportioned pipes supported in first and second rows on said rack will be disposed with the stems thereof in substantially parallel relationship.

References Cited

UNITED STATES PATENTS

| | | | |
|---|---|---|---|
| 769,350 | 9/1904 | King | 211—60 |
| 1,823,729 | 9/1931 | De Bussey | 211—60 |
| 2,291,933 | 8/1942 | Vevirit | 211—60 |

ROY D. FRAZIER, *Primary Examiner.*

F. DOMOTOR, *Assistant Examiner.*